Aug. 4, 1942.   J. L. PERKINS   2,292,013
WRINGER
Filed Sept. 12, 1940    2 Sheets-Sheet 1
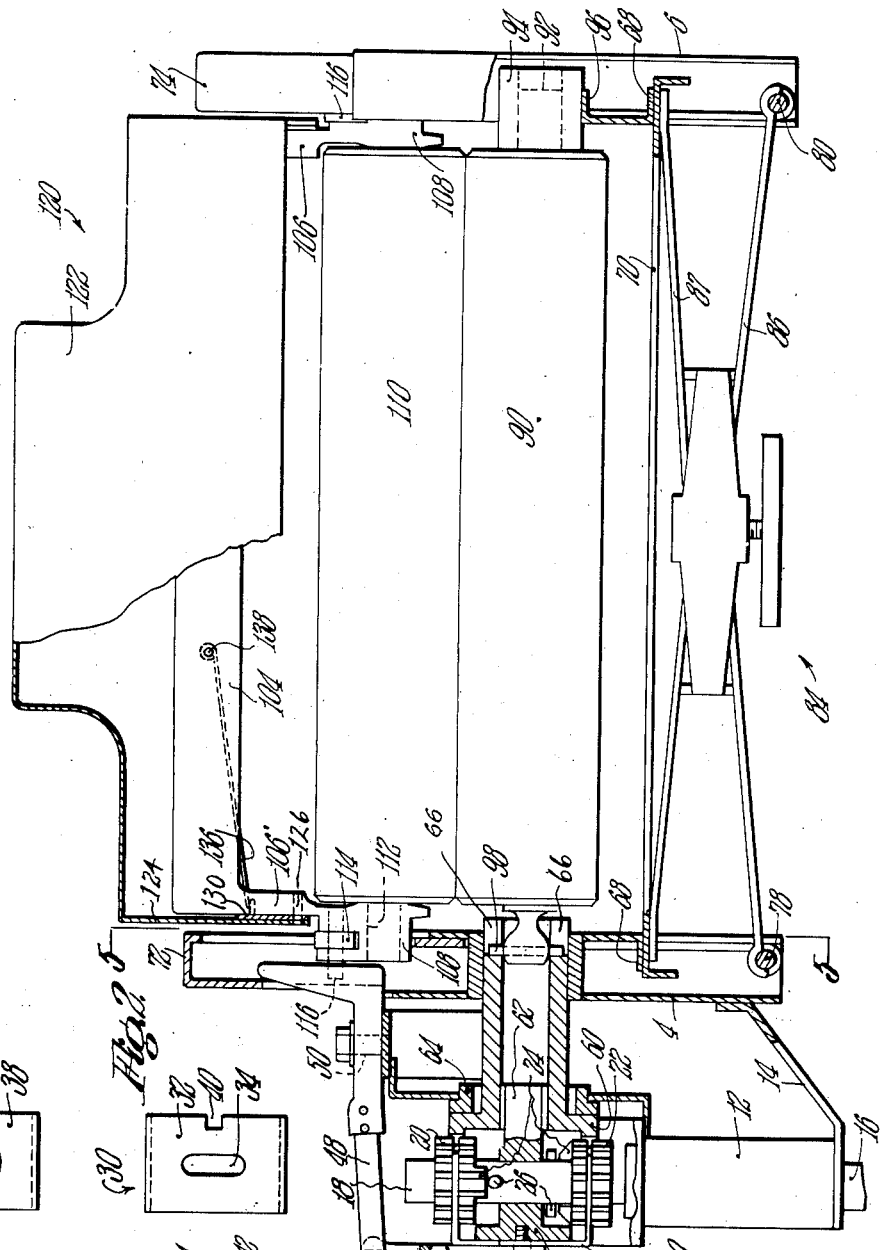
INVENTOR.
Julian L. Perkins.
BY
Walter C. Ross.
ATTORNEY.

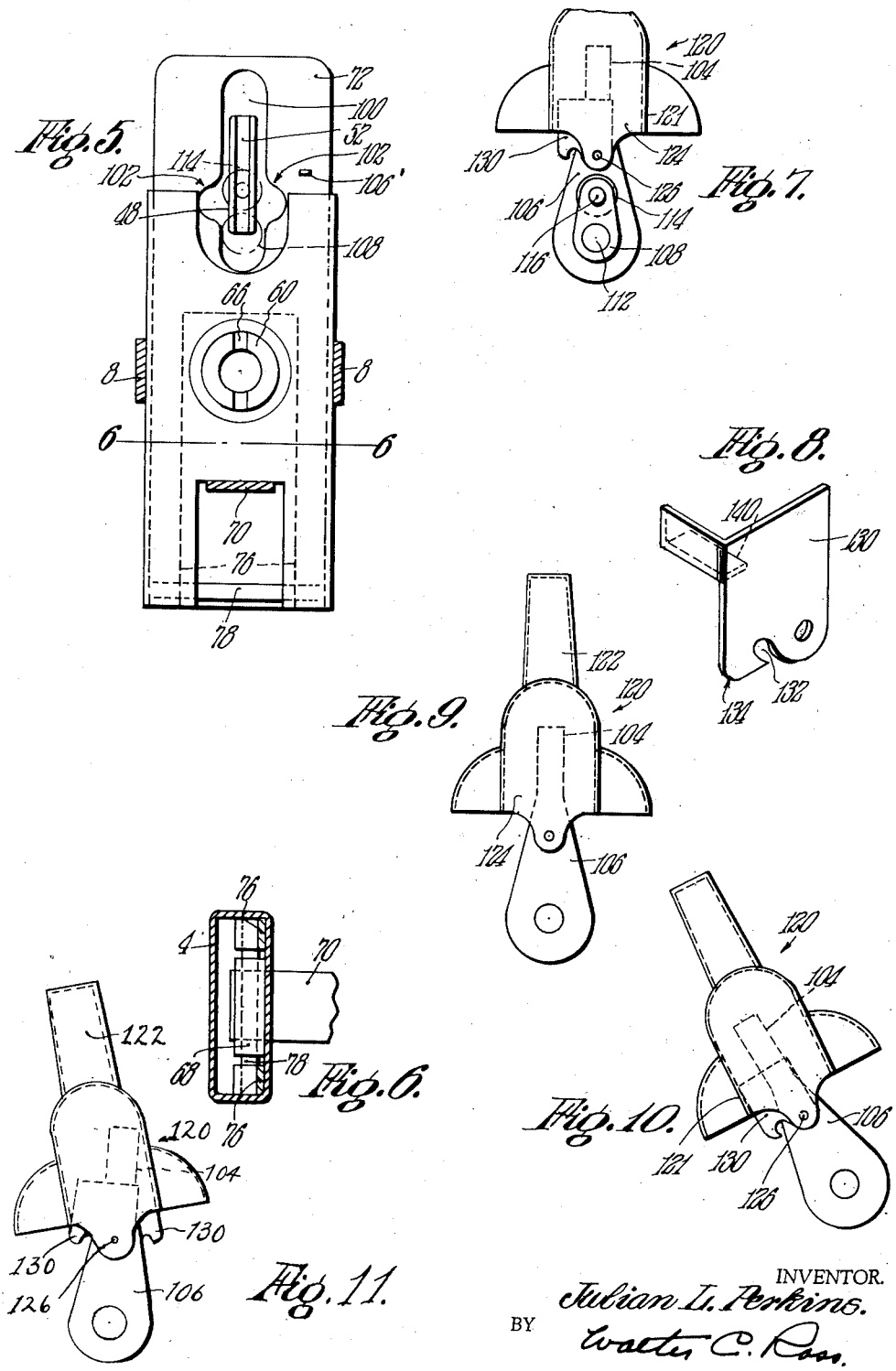

Patented Aug. 4, 1942

2,292,013

UNITED STATES PATENT OFFICE 2,292,013

WRINGER

Julian L. Perkins, West Springfield, Mass., assignor to Perkins Machine and Gear Company, West Springfield, Mass., a corporation of Massachusetts Application September 12, 1940, Serial No. 356,429

4 Claims. (Cl. 68—253)

This invention relates to improvements in wringers such as are used in connection with washing machines.

The principal objects of the invention are directed to the provision of a wringer wherein means is provided for locking the rolls in operative engagement and the driving mechanism in operable relation which is releasable by the operator thereby safeguarding the operator in the event of accident and at the same time preventing releasing of the rolls should an abnormal amount of clothes enter between the rolls.

The novel construction provides numerous advantages and objects which will be apparent from the following description of the preferred form of the invention.

In the drawings—

Fig. 1 is a side elevational view of a wringer embodying the novel features of the invention with parts in section for clearness;

Fig. 2 is a front elevational view of the gear shifter of the driving mechanism of the wringer of Fig. 1;

Fig. 3 is a plan view of the same;

Fig. 4 is a front elevational view of the gear shifter actuator of the wringer;

Fig. 5 is a sectional elevational view on the line 5—5 of Fig. 1;

Fig. 6 is a sectional plan view on the line 6—6 of Fig. 5;

Fig. 7 is a fragmentary end elevational view of the operating members and locking latch of the wringer shown in Fig. 1;

Fig. 8 is a perspective view of the locking latch of the operating member of Fig. 7;

Fig. 9 is an end elevational view of the operating members shown in Fig. 7;

Fig. 10 is a view similar to Fig. 7 with the parts in different position; and

Fig. 11 is a view similar to Figs. 7, 9 and 10 with the parts in a different position.

Referring to the drawings in detail, the invention will now be fully described.

The frame of the wringer includes in general a head 2, a head housing 4 and an outer housing 6. These may be secured together in any convenient manner but there are shown longitudinally extending side members 8 which may be welded to the housings and to the head so as to provide a strong rigid construction.

Side members as shown rigidly connect the head 2 to a column 12 and the column is connected to the housing 4 by a member 14. These parts may be welded together.

The column is adapted to be mounted on the column of a washing machine and may have a shaft 16 rotatable therein that may be driven by the usual vertical shaft of the washing machine.

A shaft 18 is rotatable in the head 2 and is rotated by the shaft 16.

Upper and lower gears 20 and 22 are slidable on the shaft 18. They are provided with projections 24 on adjacent ends which are engaged by pins 26 of shaft 18 when the gears are shifted up or down from the neutral position shown in Fig. 1.

A shifter 30 has a rear part 32 provided with a slot 34 receiving a stud 36 of head 2 and upper and lower parts 38 receivable in circumferential slots of the gears 20 and 22, as shown. The part 34 is provided with a notch 40 in which is a projection 42 of a swingable actuator 44 that is pivoted on stud 36. The upper end of the member 44 is provided with a slot 46 in which is receivable the end part of a relatively flexible lever 48. Said lever is pivoted at 50 for swinging movements. The inner end of said lever 48 is provided with a vertically extending slot 52, see Fig. 5.

As the lever 48 is swung in one direction or the other from a central or neutral position to an operative position, the actuator 44 is swung in one direction or the other to move shifter 30 up or down and thereby move the gears up or down so that one or the other engages a pin 26.

A gear 60 having teeth in engagement with gears 20 and 22 is provided with a bore receiving a part 62 of the head and it is rotatable in a bearing 64 and a bearing of member 4 as shown. As will be seen the gear is hollow and at its inner end it is provided with slots 66.

The gear 60 is rotated in one direction or the other accordingly as one or the other of the gears 20 or 22 is engaged with a pin 26.

The housings 4 and 6 are substantially alike and are tubular in cross section as shown in Fig. 6. Their adjacent inner walls have portions 68 which are turned horizontally and to which are secured as by welding, the opposite ends of a longitudinal member 70.

Cam members 72 and 74 are slidable up and down in the housings 4 and 6 and at their lower portions they are slotted to provide side members 76 Figs. 1, 5 and 6 in the lower ends of which are secured rods 78 and 80.

A pressure means indicated generally by 84 similar to that shown and described in U. S. Letters Patent No. 2,221,408 of November 12, 1940, is provided. A lower member 86 has opposite ends on the rods 78 and 80 and the opposite ends of an upper member 67 are beneath the member 70.

The pressure means resists upward movements of the cam members so that pressure is applied to the rolls when materials are passed between said rolls.

A lower wringer roll 90 has its outer shaft end 92 rotatable in a bearing 94 disposed on a ledge 96 of housing 6. The opposite shaft end 98 is receivable in the bore of gear 60 and has a pin 98 receivable in slot 66 of said gear.

By shifting the gears 20 and 22 the lower roll may be driven in one direction or the other and may be disconnected from shaft 18 when the gears are shifted to the neutral position shown.

The members 72 and 74 are provided with vertically disposed slots 100 which have cam parts 102.

An operating member 104 has downwardly depending end parts 106 provided with hubs 108. An upper roll 110 has its shaft 112 journalled in said hubs. Rolls 114 are journalled on pins of part 106 such as 116 and that pin at the left hand end of the member 104 extends into slot 52 of lever 48.

The member 104 is swingable from a central or neutral position to an operative position at either side thereof. In Fig. 5 the hub and roll at one end of the wringer are represented with reference to the member 72 by dot dash lines 108 and 114. They are in this position when the member 104 is in neutral position. As said member is swung from neutral position to an operative position, the rolls 114 are engaged with the cam surfaces of members 72 and 74 so as to releasably lock members 114 to the slidable members 72 and 74 whereby the upper roll is under the action of the pressure device. As said member 104 is swung to operative position, the gears are shifted to bring about rotation of roll 90.

A supplemental operating member 120 is hollow and has a manually engageable part 122 and end parts 124 that are pivoted at 126 to the end parts 106 of member 104. The member 120 swings to some extent relative to member 104. As it is grasped by the hand for swinging, it swings on member 104 until it engages a part of the same and then it swings said member 104.

It is desired that member 104 be releasably locked in an operative position to prevent disengagement of the operating member 104 and the members 72 and 74 as is likely to occur when an abnormal amount of material passes between the rolls. At the same time, it is desired that the member 104 may be released from the members 72 and 74 when the operator grasps member 120.

Locking latches 130 are pivoted at 126 between the ends 124 of member 120 and end portions 106 of member 104. They are provided with notches 132 and cam surfaces 134. Springs such as 136 secured to member 104 at 138 have their ends bearing on ledges 140 of the latches for urging them downwardly. Each one of the members 72 and 74 has a latch engaging lug such as 106' in Fig. 5, engageable in the notch of the adjacent latch.

As shown in Fig. 7, the latch 130 at the left hand or head end of the member 104 projects to the left or to the rear of member 104. The left hand end of the wringer is shown in Fig. 1 and is the end at which the driving mechanism is located. This latch coacts with the lug 106' on member 72 shown in Fig. 5 which is taken on the line 5—5 of Fig. 1.

The latch 130 at the right hand end of the wringer as viewed in Fig. 1 extends forwardly of member 104 or to the right with respect to the latch at the head end of said member as viewed in Fig. 7.

When it is desired to start the wringer the operator presses sideways on part 122 of member 120. The member 104 is engaged by member 120 so that by pressing on the latter the member 104 is swung so that rolls 114 engage a cam surface 102 whereby by the cam action the member 104 is releasably locked in an operating position with the spring means putting the rolls under tension.

As the member 104 approaches its operative position the rounded hook part of a latch 130 shown in Fig. 7 rides up and over a lug so the latch engages the lug and holds member 104 in operative position.

Swinging of member 120 and thereby member 104 not only releasably locks the member 104 in operative position, but engages a latch 130 with a lug 106' and at the same time through lever 48 and the shifter 30 one of the gears 20 or 22 is operatively connected to the gear 60 for driving roll 90.

The latches 130 at opposite ends of member 120 and their coacting lugs 106' are arranged so that the member 104 is locked in operative position when swung to lie at either side of its central neutral position.

When it is desired to stop the wringer, the member 104 is swung to central or neutral position. This is accomplished by grasping lever 120 which swings in pivot 126 to engage that latch 130 that is in engagement with its lug 106' so as to swing the latch whereby it releases its lug and by slightly further movement of member 120 it engages member 104 so as to cause it to swing whereupon the rolls 114 pass from off the cam surfaces and member 104 swings to neutral position.

As member 104 swings to neutral position, the gears are disengaged.

Manifestly the specific details of construction may be considerably varied from those herein shown and described without involving any departure from the principle of the invention or sacrificing any of the advantages inherent therein. While I have described my invention in this specification in great detail and particularly with repect to the present preferred form thereof, it is not desired to be limited thereto since many changes and modifications may be made therein without departing from the spirit and scope of the invention.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination in a wringer of, a frame having coacting rolls journalled therein, pressure means including movable pressure members for putting the rolls under pressure and releasing the same, an operating member movable between neutral inoperative and operative positions at either side thereof, driving mechanism including engageable members and a movable actuating member for engaging and disengaging the same, engageable connections between said operating member, actuating member and pressure members whereby when said operating member is moved to an operative position the rolls are put under pressure and the engageable members of the driving mechanism are engaged simultaneously therewith, engageable locking means associated with said movable operating member operable when the same is in operative position to releasably lock the same, and a manually engageable supplemental member movable on said operating member for moving the same from neutral to operative positions and for acting on said locking means to release the same whereby said operating member may return to neutral position and release the pressure means and disengage the engageable members of the driving mechanism.

2. The combination in a wringer of, a frame having coacting rolls journalled therein, pressure means including movable pressure members for putting the rolls under pressure and releasing the same, an operating member movable between neutral inoperative and operative positions at either side thereof, driving mechanism including engageable members and a movable actuating member for engaging and disengaging the same, engageable connections between said operating member, actuating member and pressure members whereby when said operating member is moved to an operative position the rolls are put under pressure and the engageable members of the driving mechanism are engaged simultaneously therewith, engageable locking means associated with said movable operating member operable when the same is in operative position to releasably lock the same, and a manually engageable supplemental member movable on said operating member for moving the same from neutral to operative positions and for acting on said locking means to release the same whereby said operating member may return to neutral position and release the pressure means and disengage the engageable members of the driving mechanism, the said locking means including swingable latches on said operating member engageable with coacting parts on said wringer and engageable by said supplemental member.

3. The combination in a wringer of, a frame having a roll journalled therein, a second roll, pressure means including movable pressure members for putting the rolls under pressure and releasing the same, and operating member associated with said second roll movable between neutral inoperative and operative positions at either side thereof, driving mechanism including engageable members and a movable actuating member for engaging and disengaging the same, engageable connections between said operating member, actuating member and pressure members whereby when said operating member is moved to an operative position the rolls are put under pressure and the engageable members of the driving mechanism are engaged, engageable locking means associated with said movable operating member and pressure members operable when the operating member is in operative position to releasably lock the same, and a manually engageable supplemental member movable on said operating member operable to move the same from neutral to operative positions and to release said locking means whereby said operating member may return to neutral position and release the pressure means and disengage the engageable member of the driving mechanism.

4. The combination in a wringer of, a frame having a roll journalled therein, a second roll, pressure means including movable pressure members for putting the rolls under pressure and releasing the same, an operating member in which said second roll is journalled movable between neutral inoperative and operative positions at either side thereof, driving mechanism including engageable members and a movable actuating member for engaging and disengaging the same, engageable connections between said operating member, actuating member and pressure members whereby when said operating member is moved to an operative position the rolls are put under pressure and the engageable members of the driving mechanism are engaged, engageable locking means associated with said movable operating member and pressure members operable when the same is in operative position to releasably lock the same, and a manually engageable supplemental member swingable relative to said operating member for acting on and moving the same from neutral to operative positions and for acting on said locking means to release the same whereby said operating member may return to neutral position and release the pressure means and disengage the engageable members of the driving mechanism, the said locking means including swingable latches on said operating member engageable with coacting parts provided on said pressure members and engageable by said supplemental member.

JULIAN L. PERKINS.